(No Model.)

J. P. ADAMS.
TEST TRAM OR LEVELING DEVICE FOR LEVELING OR TRAMMING ROLLS.

No. 446,764. Patented Feb. 17, 1891.

WITNESSES:

INVENTOR:
J. P. Adams
BY Munn & Co.
ATTORNEYS

UNITED STATES PATENT OFFICE.

JOSEPH PARSONS ADAMS, OF OZARK, MISSOURI.

TEST-TRAM OR LEVELING DEVICE FOR LEVELING OR TRAMMING ROLLS.

SPECIFICATION forming part of Letters Patent No. 446,764, dated February 17, 1891.

Application filed April 1, 1890. Serial No. 346,149. (No model.)

*To all whom it may concern:*

Be it known that I, JOSEPH PARSONS ADAMS, of Ozark, in the county of Christian and State of Missouri, have invented a new and Improved Test-Tram for Leveling and Tramming Rolls, of which the following is a full, clear, and exact description.

My invention relates to an improved test-tram or leveling device for leveling or tramming crushing-rolls, and has for its object to provide a simple and durable device whereby it may be expeditiously and conveniently determined, whether the rolls be in motion or not, if they are level and in tram—that is, in the same horizontal plane.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
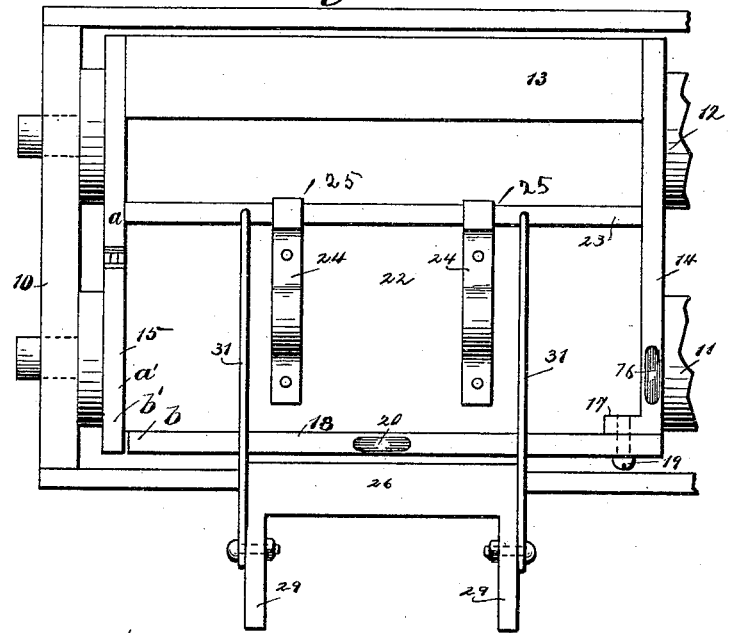
Figure 2:
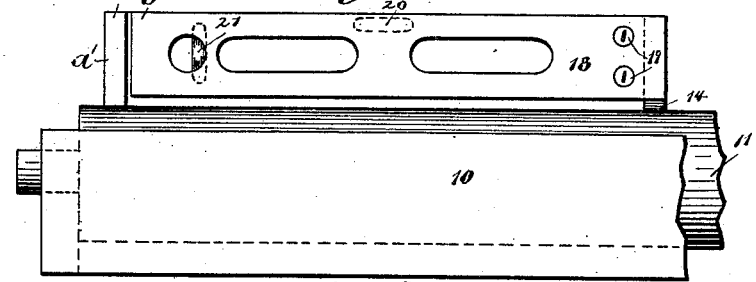
Figure 3:
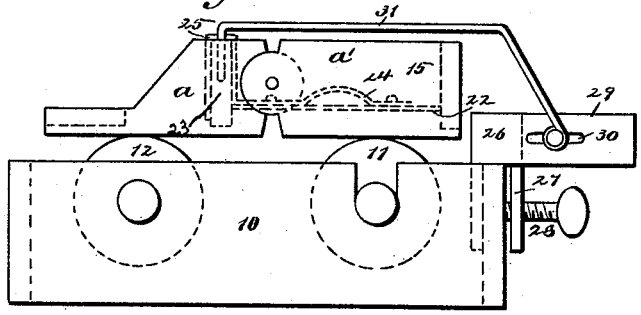

Figure 1 is a partial plan view of two rolls illustrating the application of the device thereto. Fig. 2 is a front elevation of the device located as in Fig. 1, and Fig. 3 is an end view of the same.

I have illustrated two rolls journaled in a frame 10, the forward roll 11 being readily detachable and the rear roll 12 firmly held to revolve in the frame.

The body of the device consists of a tram-plate 13, secured to the ends of side plates or bars 14 and 15. The side bar 14 is constructed in one piece and the opposite side bar 15 in two sections $a$ and $a'$, as shown in Fig. 3, which sections are united, preferably, by means of a rule-joint, the outer section $a'$ being capable of vertical movement either up or down.

In the upper edge of the one-piece side bar 14, at or near the front, a spirit-level 16 is located, and the front end of the said side bar 14 is preferably provided with an inwardly-extending arm 17, to which arm one end of the front bar or plate 18 is detachably secured through the medium of set-screws 19 or otherwise, which front bar or plate is virtually a spirit-level, having a glass 20 in its upper face near its center, and an ordinary plumbing-glass 21 is fixed near the free end, as best shown in Fig. 2. The glass 20 is intended to indicate if the rolls are level longitudinally, and will also indicate which end of the roll 11 should be raised or lowered to place it in tram.

The front plate or bar 18 is so fixed to the side bar 14 that when the device is placed upon a true flat surface the upper edge of the said front bar at its free end will be in the same plane with the upper edge of the outer section $a'$ of the side bar 15, as illustrated at $b$ and $b'$ in Fig. 2.

In operation the tram is placed across the rolls to be tested, the front portion of said tram being made, essentially, to rest upon the removable roll 11, and the front roll is adjusted until the front bar and the sectional side bar at the points $b$ and $b'$ are in the same plane, as heretofore stated, whereupon the rolls are supposed to be in tram or in the same horizontal plane.

The level-glass 16 is intended to indicate if the rolls are level transversely, and the glass 20 determines whether or not the rolls are level lengthwise. The level-glass 21 is not used unless the front bar 18 is detached and employed for plumbing any portion of the frame or the journals of the rolls.

In order to prevent dust from passing upward and obscuring the level-glasses when the rolls are tested while in motion, a dust-plate 22 is fitted to the space intervening the front leveling bar or plate 18 of the device and the intermediate cross-bar 23. The said dust-plate is detachably held in this space, and the means of attachment consist in straps 24, secured to the upper surface of the plate, which straps at their rear ends are bent to form, as shown at 25 in Fig. 3, to clamp the upper surface of the intermediate cross-bar 23.

In order to retain the device in contact with the rolls when so desired, a bracket-bar 26 is attached to the front side bar of the frame 10 through the medium of lugs 27, projected downward from the bottom of the bracket-bar, and set-screws 28, as best shown in Fig. 3, the said bracket-bar at its ends being provided with forwardly-extending horizontal arms 29, in each of which arms a horizontal slot 30 is produced.

An essentially U-shaped clamp-bar 31 is held in adjustable attachment at one end of each of the arms 29 by a set-screw being passed through the rear end of the clamp-bar and the slot 30 of the bracket-arm. The forward ends of the bracket-bars, which are downwardly curved, are introduced into suitable apertures formed in the upper edge of the intermediate cross-bar 23. These two bars 31 hold the tram in position and prevent it from moving when in use.

By making the tram about one-half the length of the rolls and passing it over the rolls from end to end while the rolls are running, it will prove conclusively if the rolls are round. If the rollers are not true, the point $b$ will be elevated above or depressed below the point $b'$.

Having thus described my invention, I claim as new and desire to secure by Letters Patent—

1. In a device of the character described, the combination, with a rear leveling or tramming plate, a side bar in one piece secured to one end of the plate, and a sectional side bar secured to the other end of the leveling or tramming plate, the outer section whereof is capable of vertical movement, of a front leveling-bar secured at one end to the forward extremity of the one-piece side bar, the said leveling-bar being constructed of such a length that its free end will closely approach the outer end of the movable section of the sectional side bar, substantially as shown and described.

2. In a device of the character described, the combination, with a rear leveling or tramming plate, a side bar in one piece secured to one end of the plate, and having a level in its upper surface and a sectional side bar secured to the other end of the leveling or tramming plate, the outer section whereof is capable of vertical movement, of a front leveling-bar secured at one end to the forward extremity of the one-piece side bar, the said leveling-bar being provided with a glass in its upper surface and constructed of such a length that its free end will closely approach the outer end of the movable section of the sectional side bar, substantially as shown and described.

3. In a device of the character described, the combination, with a rear leveling or tramming plate, a side bar in one piece secured to one end of the plate, having a level in its upper surface, and a sectional side bar secured to the other end of the leveling or tramming plate, the outer section whereof is capable of vertical movement, of a front leveling-bar secured at one end to the forward extremity of the one-piece side bar, the said leveling-bar being provided with a glass in its upper surface and constructed of such a length that its free end will closely approach the outer end of the movable section of the sectional side bar, an intermediate cross-bar uniting the one-piece side bar and the rear section of the sectional side bar, and a dust-plate adapted to cover the space between the side bars, the front leveling-bar, and intermediate cross-bar, the said dust-plate being removably secured to the device, substantially as shown and described.

4. In a device of the character described, the combination, with a rear leveling or tramming plate, a side bar constructed in one piece, provided near its forward end with a level glass and integral with one end of the leveling-plate, a shorter side bar integral with the opposite end of the plate and provided with a hinged extension, a cross-bar uniting the fixed side bars, and a front or leveling bar detachably secured at one end to the forward extremity of the one-piece side bar, the free end of which leveling-bar is made to closely approach the outer end of the hinged side section, of a dust-plate attached to the intermediate cross-bar and covering the space between the side bars, the intermediate cross-bar, and the front or leveling bar, a bracket-bar adapted to be attached to the frame of the rolls, and clamping-bars adjustably secured to the bracket-bar and removably attached to the intermediate cross-bar, substantially as shown and described, and for the purpose specified.

5. The combination, with a tram for leveling and tramming grinding-rolls, of a frame adapted to be attached to the frame of the rolls and provided with backwardly-extending adjustable bars adapted to engage the intermediate cross-bar of the tram, substantially as shown and described.

JOSEPH PARSONS ADAMS.

Witnesses:
H. V. REDDING,
T. D. PATTERSON.